(12) United States Patent
Choi et al.

(10) Patent No.: US 12,031,028 B2
(45) Date of Patent: Jul. 9, 2024

(54) POLYAMIDE RESIN FILM AND RESIN LAMINATE USING THE SAME

(71) Applicant: LG CHEM, LTD., Seoul (KR)

(72) Inventors: Il Hwan Choi, Daejeon (KR); Young Ji Tae, Daejeon (KR); Soonyong Park, Daejeon (KR); Youngseok Park, Daejeon (KR); Bi Oh Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 746 days.

(21) Appl. No.: 17/256,055

(22) PCT Filed: Dec. 26, 2019

(86) PCT No.: PCT/KR2019/018449
§ 371 (c)(1),
(2) Date: Dec. 24, 2020

(87) PCT Pub. No.: WO2020/159085
PCT Pub. Date: Aug. 6, 2020

(65) Prior Publication Data
US 2021/0222007 A1 Jul. 22, 2021

(30) Foreign Application Priority Data
Feb. 1, 2019 (KR) .................. 10-2019-0014020
Feb. 1, 2019 (KR) .................. 10-2019-0014021
(Continued)

(51) Int. Cl.
C08L 77/10 (2006.01)
B32B 27/08 (2006.01)
(Continued)

(52) U.S. Cl.
CPC .............. *C08L 77/10* (2013.01); *B32B 27/08* (2013.01); *C08G 69/265* (2013.01); *C08G 69/42* (2013.01);
(Continued)

(58) Field of Classification Search
CPC .. C08L 77/10; C08L 2201/08; C08L 2201/10; C08L 2203/16; C08L 2203/20;
(Continued)

(56) References Cited

U.S. PATENT DOCUMENTS 5,076,817 A 12/1991 Hayes
5,132,393 A 7/1992 Yoon et al.
(Continued)

FOREIGN PATENT DOCUMENTS

CN 1708537 A 12/2005
CN 108794740 A 11/2018
(Continued)

OTHER PUBLICATIONS

Thomson Scientific, London, GB; AN 2005-438357, XP002803292, 2017, 3 pages.
(Continued)

*Primary Examiner* — John D Freeman
(74) *Attorney, Agent, or Firm* — ROTHWELL, FIGG, ERNST & MANBECK, P.C.

(57) ABSTRACT

The present invention relates to a polyamide resin film having improved UV shielding function by using a polyamide resin having a backbone chain of alternative structure of two types of polyamide segments; and a resin laminate using the polyamide resin film.

18 Claims, 2 Drawing Sheets

(30) Foreign Application Priority Data

| Jun. 5, 2019 | (KR) | 10-2019-0066620 |
|---|---|---|
| Dec. 23, 2019 | (KR) | 10-2019-0173086 |
| Dec. 24, 2019 | (KR) | 10-2019-0174355 |

(51) Int. Cl.

| B32B 27/34 | (2006.01) |
|---|---|
| C08G 69/26 | (2006.01) |
| C08G 69/42 | (2006.01) |
| C08K 5/3475 | (2006.01) |
| C08K 5/3492 | (2006.01) |

(52) U.S. Cl.
CPC .......... *C08K 5/3475* (2013.01); *C08K 5/3492* (2013.01); *B32B 27/34* (2013.01); *B32B 2250/02* (2013.01); *B32B 2250/03* (2013.01); *B32B 2307/412* (2013.01); *B32B 2307/71* (2013.01); *B32B 2457/20* (2013.01); *C08L 2201/08* (2013.01); *C08L 2201/10* (2013.01); *C08L 2203/16* (2013.01); *C08L 2203/20* (2013.01)

(58) Field of Classification Search
CPC ......... C08L 77/06; B32B 27/08; B32B 27/34; B32B 2250/02; B32B 2250/03; B32B 27/18; B32B 2307/412; B32B 2307/71; B32B 2457/20; C08G 69/265; C08G 69/42; C08G 69/02; C08G 69/26; C08J 5/18; C08J 2377/06; C08J 2433/06; C08J 7/0427; C08J 7/046; C08K 5/3475; C08K 5/3492; C08K 5/00

See application file for complete search history.

(56) References Cited

U.S. PATENT DOCUMENTS

| 7,214,742 | B2 | 5/2007 | Bolle et al. |
|---|---|---|---|
| 7,294,714 | B2 | 11/2007 | Lazzari et al. |
| 7,638,626 | B2 | 12/2009 | Lazzari et al. |
| 8,138,243 | B2 | 3/2012 | Buehler et al. |
| 8,648,982 | B2 | 2/2014 | Yanai et al. |
| 9,580,555 | B2 | 2/2017 | Ju et al. |
| 9,834,867 | B2 | 12/2017 | Zaltieri et al. |
| 9,961,548 | B2 | 5/2018 | Bryksa et al. |
| 9,963,548 | B1 | 5/2018 | Sun et al. |
| 10,689,513 | B2 | 6/2020 | Ahn et al. |
| RE48,141 | E | 8/2020 | Ju et al. |
| 11,351,763 | B2 | 6/2022 | Ryu et al. |
| 2004/0241111 | A1 | 12/2004 | Lazzari et al. |
| 2005/0171253 | A1 | 8/2005 | Andrews et al. |
| 2006/0106193 | A1 | 5/2006 | Moriyama et al. |
| 2007/0249789 | A1 | 10/2007 | Buehler et al. |
| 2008/0032078 | A1 | 2/2008 | Lazzari et al. |
| 2011/0178266 | A1 | 7/2011 | Cho et al. |
| 2012/0244330 | A1 | 9/2012 | Sun et al. |
| 2012/0296037 | A1 | 11/2012 | Cho et al. |
| 2013/0011642 | A1 | 1/2013 | Sun et al. |
| 2014/0083624 | A1 | 3/2014 | Harris et al. |
| 2014/0084499 | A1 | 3/2014 | Harris et al. |
| 2015/0097174 | A1 | 4/2015 | Sun et al. |
| 2015/0266998 | A1 | 9/2015 | Zaltieri et al. |
| 2016/0032052 | A1* | 2/2016 | Katayama ............. C08G 69/32 528/348 |
| 2016/0208096 | A1 | 7/2016 | Sun et al. |
| 2017/0329062 | A1 | 11/2017 | Nakajima et al. |
| 2018/0002487 | A1 | 1/2018 | Yang et al. |
| 2018/0094135 | A1 | 4/2018 | Sun et al. |
| 2019/0077915 | A1 | 3/2019 | Yun et al. |
| 2019/0077917 | A1 | 3/2019 | Jeong et al. |
| 2020/0024401 | A1 | 1/2020 | Ryu et al. |
| 2020/0031962 | A1 | 1/2020 | Kim et al. |
| 2021/0189067 | A1 | 6/2021 | Ryu et al. |
| 2021/0222007 | A1 | 7/2021 | Choi et al. |
| 2021/0230425 | A1 | 7/2021 | Choi et al. |
| 2022/0033653 | A1 | 2/2022 | Choi et al. |

FOREIGN PATENT DOCUMENTS

| EP | 1564237 A1 | 8/2005 |
|---|---|---|
| EP | 3476592 A1 | 5/2019 |
| EP | 3392295 B1 | 1/2020 |
| JP | H04-226533 A | 8/1992 |
| JP | H09-239889 A | 9/1997 |
| JP | 2002-191928 A | 7/2002 |
| JP | 2005-146133 A | 6/2005 |
| JP | 2005-517787 A | 6/2005 |
| JP | 2006-077185 A | 3/2006 |
| JP | 2006-213812 A | 8/2006 |
| JP | 2006-316134 A | 11/2006 |
| JP | 2008-074991 A | 4/2008 |
| JP | 2011124174 A | 6/2011 |
| JP | 2013-079334 A | 5/2013 |
| JP | 2014-052604 A | 3/2014 |
| JP | 2015-120886 A | 7/2015 |
| JP | 2015-166179 A | 9/2015 |
| JP | 2016-145332 A | 8/2016 |
| JP | 7074280 B2 | 5/2022 |
| JP | 7088499 B2 | 6/2022 |
| KR | 10-2004-0096558 A | 11/2004 |
| KR | 10-2005-0067217 A | 6/2005 |
| KR | 10-2007-0104246 A | 10/2007 |
| KR | 10-2008-0101782 A | 11/2008 |
| KR | 10-2010-0035596 A | 4/2010 |
| KR | 10-2012-0130332 A | 11/2012 |
| KR | 10-2015-0067761 A | 6/2015 |
| KR | 10-2016-0085078 A | 7/2016 |
| KR | 10-2016-0089872 A | 7/2016 |
| KR | 10-2017-0089585 A | 8/2017 |
| KR | 10-2017-0126798 A | 11/2017 |
| KR | 10-2017-0136285 A | 12/2017 |
| KR | 10-2018-0062439 A | 6/2018 |
| KR | 10-2018-0090671 A | 8/2018 |
| KR | 10-2018-0098003 A | 9/2018 |
| KR | 10-2018-0131378 A | 12/2018 |
| KR | 10-2019-0028337 A | 3/2019 |
| KR | 10-2020-0050792 A | 5/2020 |
| KR | 10-2020-0051476 A | 5/2020 |
| KR | 10-2020-0067084 A | 6/2020 |
| TW | I602854 B | 10/2017 |
| TW | I606083 B | 11/2017 |
| WO | 2003-070819 A1 | 8/2003 |
| WO | 2004039863 A1 | 5/2004 |
| WO | 2012-146629 A1 | 11/2012 |
| WO | 2017-221783 A1 | 12/2017 |
| WO | 2018-155830 A1 | 8/2018 |

OTHER PUBLICATIONS

Thomson Scientific, London, GB; AN 2006-235222, XP002803663, 2017, 3 pages.

Extended European Search Report issued for European Patent Application No. 19912432.2 on Jun. 23, 2021, 14 pages.

Extended European Search Report issued for European Patent Application No. 19913033.7 on Jul. 30, 2021, 17 pages.

International Search Repose issued for International Application No. PCT/KR2019/018449 on Apr. 21, 2020, 4 pages.

\* cited by examiner

[FIG. 1]
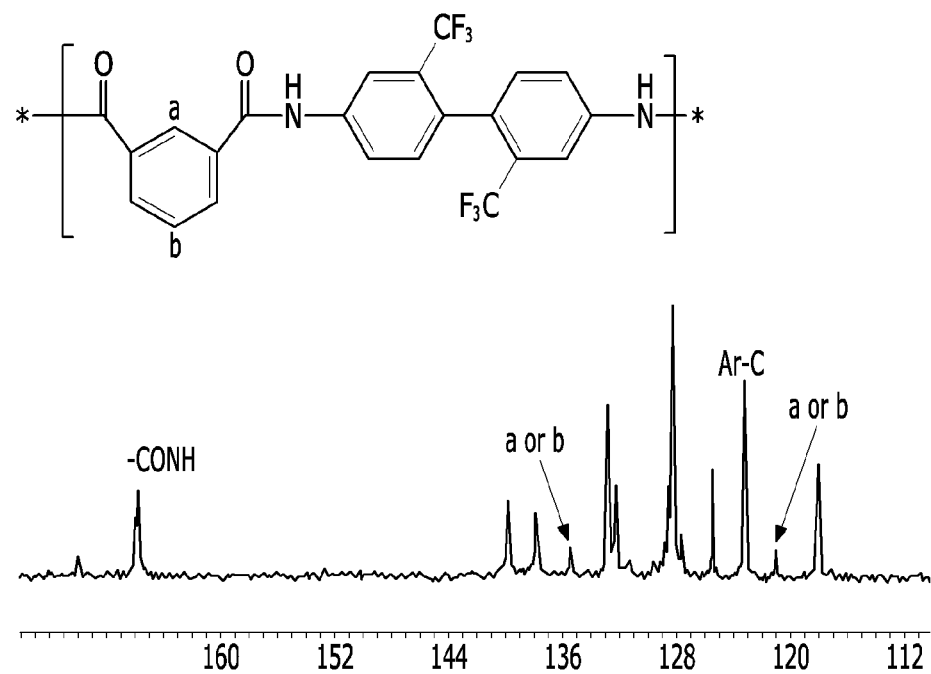

[FIG. 2]
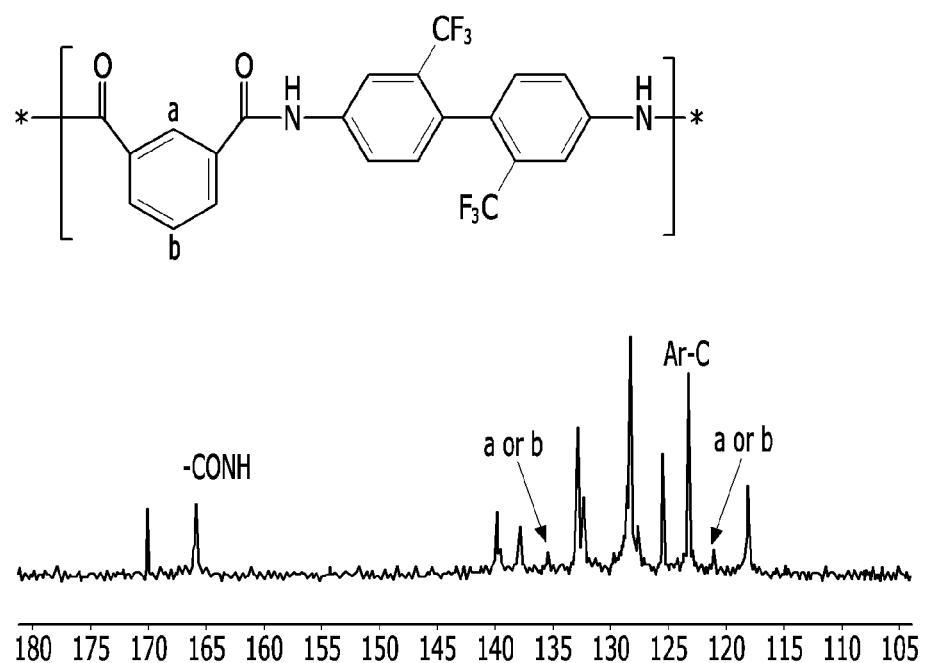

POLYAMIDE RESIN FILM AND RESIN LAMINATE USING THE SAME

CROSS-REFERENCE TO RELATED APPLICATION(S)

This application is a 35 U.S.C. 371 National Phase Entry Application from PCT/KR2019/018449, filed on Dec. 26, 2019, designating the United States, which claims the benefit of priority from Korean Patent Application No. 10-2019-0014020 filed on Feb. 1, 2019; Korean Patent Application No. 10-2019-0014021 filed on Feb. 1, 2019; Korean Patent Application No. 10-2019-0066620 filed on Jun. 5, 2019; Korean Patent Application No. 10-2019-0173086 filed on Dec. 23, 2019; and Korean Patent Application No. 10-2019-0174355 filed on Dec. 24, 2019 in the Korean Intellectual Property Office, the disclosures of which are incorporated herein by reference in their entirety.

TECHNICAL FIELD

The present invention relates to a polyamide resin film that can secure at least an adequate level of mechanical properties and excellent transparency while improving the UV shielding function and a resin laminate using the same.

BACKGROUND OF THE INVENTION

Aromatic polyimide resins are polymers mostly having an amorphous structure, and exhibits excellent heat resistance, chemical resistance, electrical properties, and dimensional stability due to their rigid chain structure. Thus, these polyimide resins are widely used as materials for electric/electronics.

However, the polyimide resins have many limitations in their use because they may appear dark brown in color due to charge transfer complex (CTC) formation of Pi-electrons present in the imide chain, and it is difficult to secure transparency. In the case of the polyimide film including the same, it has a drawback in that the surface is easily scratched and scratch resistance is very weak.

In order to solve the above limitation of the polyimide resin, studies on polyamide resins into which an amide group is introduced has been actively conducted. The amide structure induces intermolecular or intramolecular hydrogen bonds, resulting in improvement of scratch resistance by interactions such as hydrogen bonds.

However, due to the difference in solubility, reactivity (steric hindrance), and reaction rate of terephthaloyl chloride or isophthaloyl chloride used for the synthesis of the polyamide resin, amide repeating units derived from terephthaloyl chloride and amide repeating units derived from isophthaloyl chloride do not form a block, and are hardly polymerized ideally or alternatively.

Therefore, there is a limit that as the block of amide repeating units derived from the para acyl chloride monomer is formed and the crystallinity of the polyamide resin increases, the transparency becomes poor due to haze.

In addition, as the monomers used for the synthesis of the polyamide resin perform the polymerization reaction in a state dissolved in a solvent, the molecular weight of the finally synthesized polyamide resin is difficult to be ensured to a sufficient level due to deterioration by moisture or hybridization with a solvent.

Accordingly, there is a continuing need to develop a polyamide resin capable of realizing transparency and mechanical properties simultaneously.

BRIEF SUMMARY OF THE INVENTION

The present invention provides a polyamide resin film that can secure at least an adequate level of mechanical properties and excellent transparency while improving the UV shielding function.

The present invention provides a resin laminate using the aforementioned polyamide resin film.

In order to achieve the above objects, one aspect of the present invention provides a polyamide resin film including: a polyamide resin containing a backbone chain formed by alternative bonding of a first polyamide segment containing a first aromatic amide repeating unit, and a second polyamide segment containing a second aromatic amide repeating unit having a structure different from the first aromatic amide repeating unit, wherein a transmittance of ultraviolet light with a wavelength of 388 nm for a specimen having a thickness of 45 μm or more and 55 μm or less is 15% or less, and wherein a UV-cut slope (dT/dλ) measured for a specimen having a thickness of 45 μm or more and 55 μm or less according to ASTM E424 is 0.25 or more in the range of 10% to 80% transmittance.

Another aspect of the present invention provides a resin laminate including a substrate including the polyamide resin film; and a hard coating layer formed on at least one side of the substrate.

DETAILED DESCRIPTION OF THE INVENTION

Hereinafter, a polyamide resin film and a resin laminate using the same according to specific embodiments of the present invention will be described in more detail.

Unless explicitly stated otherwise, the terminology used herein may be defined as follows.

Throughout the specification, when one part "includes" one constituent element, unless otherwise specifically described, this does not mean that another constituent element is excluded, but means that another constituent element may be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group: an arylthioxy group; an alkylsulfoxy group; an arylsulfoxy group; a silyl group; a boron group; an alkyl group; a haloalkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked. Preferably, a haloalkyl group can be used as the substituent, and examples of the haloalkyl group include trifluoromethyl group.

As used herein, the notation +, or −, means a bond linked to another substituent group, and a direct bond means the case where no other atoms exist in the parts represented as L.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, iso-pentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl and the like, but are not limited thereto.

In the present specification, the aryl group is a monovalent functional group derived from an arene, and is not particularly limited, but preferably has 6 to 20 carbon atoms, and may be a monocyciic aryl group or a polycyclic aryl group. The monocyclic aryl group may include, but not limited to, a phenyl group, a biphenyl group, a terphenyl group, or the like. The polycyclic aryl group may include, but not limited to, a naphthyl group, an anthracenyl group, a phenanthryl group, a pyrenyl group, a perylenyl group, a chrysenyl group, a fluorenyl group or the like. The aryl group may be substituted or unsubstituted.

In the present specification, the arylene group is a bivalent functional group derived from an arene, and the description of the aryl group as defined above may be applied, except that it is a divalent functional group. For example, it may be a phenylene group, a biphenylene group, a terphenylene group, a naphthalenediyl group, a fluorenylene group, a pyrenylene group, a phenanthrenylene group, a perylenediyl group, a tetracenylene group, an anthracenylene group and the like. The arylene group may be substituted or unsubstituted.

In the present specification, a heteroaryl group includes one or more atoms other than carbon, that is, one or more heteroatoms, and specifically, the heteroatom may include one or more atoms selected from the group consisting of O, N, Se, and S, and the like. The number of carbon atoms thereof is not particularly limited, but is preferably 4 to 20, and the heteroaryl group may be monocyclic or polycyclic. Examples of a heteroaryl group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidinyl group, a pyridopyrazinyl group, a pyrazinopyrazinyl group, an isoquinolinyl group, an indo-lyl group, a carbazolyl group, a benzoxazolyl group, a benzimidazolyl group, a benzothiazolyl group, a benzocar-bazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridinyl group, an azaindolyl group, an isoindolyl group, an indazolyl group, a purine group (purine), a pteridinyl group (pteridine), a beta-carboline group, a naphthyridinyl group (naphthyridine), a ter-pyridyl group, a phenazinyl group, an imidazopyridyl group, a pyropyridyl group, an azepine group, a pyrazolyl group, a dibenzofuranyl group, and the like, but are not limited thereto. The heteroaryl group may be substituted or unsubstituted.

In the present specification, the hetero arylene group has 2 to 20, or 2 to 10, or 6 to 20 carbon atoms. For the hetero arylene group containing 0, N or S as a hetero atom, the description of the heteroaryl group as defined above can be applied except that it is a divalent functional group. The hetero arylene group may be substituted or unsubstituted.

In this specification, examples of halogen include fluorine, chlorine, bromine or iodine.

I. Polyamide Resin Film

According to one embodiment of the present invention, there can be provided a polyamide resin film including a polyamide resin containing a backbone chain formed by alternative bonding of a first polyamide segment containing a first aromatic amide repeating unit, and a second polyamide segment containing a second aromatic amide repeating unit having a structure different from the first aromatic amide repeating unit, wherein a transmittance of ultraviolet light with a wavelength of 388 nm for a specimen having a thickness of 45 μm or more and 55 μm or less is 15% or less, and wherein a UV-cut slope (dT/dλ) measured for a specimen having a thickness of 45 μm or more and 55 μm or less according to ASTM E424 is 0.25 or more in the range of 10% to 80% transmittance.

The present inventors have found through experiments that as the polyamide resin film includes a specific polyamide resin and also satisfies the conditions in which a transmittance of ultraviolet light with a wavelength of 388 nm for a specimen having a thickness of 45 μm or more and 55 μm or less is 15% or less and a UV-cut slope (dT/dλ) measured for a specimen having a thickness of 45 μm or more and 55 μm or less according to ASTM E424 is 0.25 or more in the range of 10% to 80% transmittance, the characteristics of blocking the light of the wavelength of the external ultraviolet region and protecting the material inside the electronic equipment are strengthened, and it can secure at least an adequate level of mechanical properties and excellent transparency while realizing excellent UV shielding function when applied to the cover window film or the like, thereby completing the present invention.

Specifically, as the polyamide resin film of one embodiment includes a polyamide resin containing a backbone chain formed by alternative bonding of a first polyamide segment containing a first aromatic amide repeating unit, and a second polyamide segment containing a second aromatic amide repeating unit having a structure different from the first aromatic amide repeating unit, it is possible to minimize the growth of the length of the first polyamide segment in the polyamide resin and lower the crystallinity of the polyamide resin, thus implementing a transparent polyamide resin film.

Specifically, the backbone chain of the polyamide resin may form a polymer chain consisting of alternating structure of the first polyamide segment and the second polyamide segment. That is, the second polyamide segment is positioned between the first polyamide segments, and may serve to suppress the growth of the length of the first polyamide segment.

In this manner, when the growth of the length of the first polyamide segment is suppressed, the haze value of the polyamide resin film can be remarkably lowered while the crystal properties of the first polyamide segment are reduced, thereby achieving excellent transparency.

Meanwhile, "the backbone chain of the polyamide resin forms a polymer chain consisting of alternating structure of a first polyamide segment and a second polyamide segment" is considered to be due to the formation of a melt-kneaded complex in the preparation method of the polyamide resin.

Hereinafter, the present invention will be described in more detail.

The polyamide resin film may have a transmittance (T, @388 nm) of ultraviolet light with a wavelength of 388 nm for a specimen having a thickness of 45 μm or more and 55 μm or less, or 48 μm or more and 52 μm or less of 15% or less, or 14% or less, or 0.1% or more and 15% or less, or 1% or more and 15% or less, or 10% or more and 15% or less, or 10% or more and 14% or less, or 11% or more and 13.5% or less. The fact that the polyamide resin film has a low transmittance to ultraviolet rays may mean that it absorbs ultraviolet rays to a high level and has excellent ultraviolet shielding properties.

The transmittance of the polyamide resin film with respect to ultraviolet light having a wavelength of 388 nm can be confirmed through commonly known measuring methods and measuring devices. For example, a method of measuring the total light transmittance of the polyamide resin film using a Shimadzu UV-2600 UV-vis spectrometer can be used.

When the transmittance (transmittance, @388 nm) of ultraviolet light with a wavelength of 388 nm for a specimen having a thickness of 45 μm or more and 55 μm or less, or 48 μm or more and 52 μm or less is excessively increased to more than 15%, it is difficult to implement a UV shielding function at a level applicable to the cover window film, and thus, light having a wavelength in the external ultraviolet region penetrates into the electronic device, which may cause problems such as deformation and discoloration of the internal material.

Meanwhile, the polyamide resin film may have an UV-cut slope (dT/dλ) measured for a specimen having a thickness of 45 μm or more and 55 μm or less, or 48 μm or more and 52 μm or less according to ASTM E424, of 0.25 or more, or 0.5 or more, or 1.0 or more, or 0.25 or more and 10 or less, or 0.25 or more and 8 or less, or 0.25 or more and 6 or less, or 0.5 or more and 10 or less, or 0.5 or more and 8 or less, or 0.5 or more and 6 or less, or 0.6 or more and 6 or less, or 0.68 or more and 5.5 or less, or 1 or more and 10 or less, or 1 or more and 8 or less, or 1 or more and 6 or less in the range of 10% to 80% transmittance.

The UV-cut slope (dT/dλ) of the polyamide resin film may mean an instantaneous slope, that is, a differential coefficient, on the x-y graph where the x-axis is wavelength (λ) and the y-axis is transmittance.

As such, as the polyamide resin film has a relatively high UV-cut slope, it can have colorless and transparent optical properties together with excellent UV shielding function.

In contrast, when the UV-cut slope (dT/dλ) of the polyamide resin film, which is measured for a specimen having a thickness of 45 μm or more and 55 μm or less, or 48 μm or more and 52 μm or less according to ASTM E424, is excessively reduced by less than 0.25 in the range of 10% to 80% transmittance, it has a low UV-cut slope, which may lead to degradation of UV shielding function, etc.

Further, in this case, the UV-cut off wavelength (wavelength when transmittance is less than 1%) may be 350 nm to 385 nm.

The UV-cut slope of the polyamide resin film can be confirmed through commonly known measuring methods and measuring devices. For example, a method of measuring the UV-cut off wavelength (k) and UV-cut slope (dT/dλ) of the polyamide resin film according to the ASTM E424 test method using a UV-Vis spectrophotometer (manufacturer: Shimadzu, model: UV2600) can be used.

More specifically, the polyamide resin film may have an UV-cut slope (dT/dλ) measured for a specimen having a thickness of 45 μm or more and 55 μm or less, or 48 μm or more and 52 μm or less according to ASTM E424, of 0.5 or more, or 0.8 or more, or 0.5 or more and 2.0 or less, or 0.8 or more and 2.0 or less at 80% transmittance.

Further, the polyamide resin film may have an UV-cut slope (dT/dλ) measured for a specimen having a thickness of 45 μm or more and 55 μm or less, or 48 μm or more and 52 μm or less according to ASTM E424, of 2 or more, or 3 or more, or 2 or more and 5 or less, or 3 or more and 5 or less at 10% transmittance.

The thickness of the polyamide resin film is not particularly limited, but for example, it can be freely adjusted within the range of 0.01 μm to 1000 μm. When the thickness of the polyamide resin film increases or decreases by a specific value, the physical properties measured in the polyamide resin film may also change by a certain value.

The polyamide resin film may be prepared by a conventional method such as a dry method or a wet method using the polyamide resin of the one embodiment. For example, the polyamide resin film may be formed by a method of coating a solution containing the polyamide resin of one embodiment onto an arbitrary support to form a film, evaporating the solvent from the film and drying it. If necessary, stretching and heat treatment of the polyamide resin film may be further performed.

As the polyamide resin film is produced using the polyamide resin of one embodiment, it is possible to exhibit excellent mechanical properties while being colorless and transparent.

Specifically, the haze measured according to ASTM D1003 for a specimen having a thickness of 50±2 μm may be 3.0% or less, or 1.5% or less, or 1.00% or less, or 0.85% or less, or 0.10% to 3.0%, or 0.10% to 1.5%, or 0.10% to 1.00%, or 0.40% to 1.00%, or 0.40% to 0.90%, or 0.40% to 0.80%. When the haze of the polyamide resin film measured according to ASTM D1003 is increased by more than 3.0%, the opacity is increased and thus, it is difficult to secure a sufficient level of transparency.

The polyamide resin film has a yellowness index (YI) measured for a specimen having a thickness of 45 μm or more and 55 μm or less, or 48 μm or more and 52 μm or less according to ASTM E313 of 4.0 or less, or 3.1 or less, or 0.5 to 4.0, or 0.5 to 3.1, or 2.5 to 3.1. When the yellowness index (YI) of the polyamide resin film measured according to ASTM E313 is increased by more than 4.0, the opacity is increased and thus it is difficult to secure a sufficient level of transparency.

The polyamide resin film may have a transmittance (T, @550 nm) of visible light with a wavelength of 550 nm for a specimen having a thickness of 45 μm or more and 55 μm or less, or 48 μm or more and 52 μm or less of 86% or less, or 86% or more and 90% or less.

Further, the polyamide resin film may have a folding endurance measured for a specimen having a thickness of 45 µm or more and 55 µm or less, or 48 µm or more and 52 µm or less (the number of reciprocating bending cycles at an angle of 135°, a rate of 175 rpm, a radius of curvature of 0.8 mm and a load of 250 g) of 4000 cycles or more, or 7000 cycles or more, or 9000 cycles or more, or 4000 cycles to 20000 cycles, or 7000 cycles to 20000 cycles, or 9000 cycles to 20000 cycles, or 10000 cycles or more and 15000 cycles or less, or 10000 cycles or more and 14000 cycles or less.

Further, the polyamide resin film may have a pencil hardness value measured for a specimen having a thickness of 45 µm or more and 55 µm or less, or 48 µm or more and 52 µm or less according to ASTM D3363 of 1H or more, or 3H or more, or 1H to 4H, or 3H to 4H.

Specifically, the polyamide resin film may include a polyamide resin composition including the polyamide resin and the ultraviolet light stabilizer, or a cured product thereof. The cured product means a material obtained through a curing process of the polyamide resin composition.

The polyamide resin film may be prepared by a conventional method such as a dry method or a wet method using the above-mentioned polyamide resin composition. For example, the polyamide resin film may be formed by a method of coating a solution containing the polyamide resin and the ultraviolet light stabilizer onto an arbitrary support to form a film, evaporating the solvent from the film and drying it. If necessary, stretching and heat treatment of the polyamide resin film may be further performed.

When the polyamide resin film is produced using the polyamide resin composition, it can realize excellent optical and mechanical properties and at the same time have flexibility and thus, can be used as a material of various molded articles. For example, the polyamide resin film may be applied to a display substrate, a display protective film, a touch panel, a window cover of a foldable device, and the like.

The polyamide resin may include a first polyamide segment containing a first aromatic amide repeating unit, and a second polyamide segment containing a second aromatic amide repeating unit having a structure different from the first aromatic amide repeating unit.

Specifically, the first aromatic amide repeating unit may be a repeating unit represented by the following Chemical Formula 1.

[Chemical Formula 1]

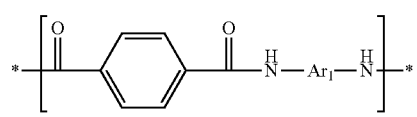

in Chemical Formula 1, Ar$_1$ is a substituted or unsubstituted arylene group having 6 to 20 carbon atoms, or a substituted or unsubstituted heteroarylene group having 2 to 20 carbon atoms.

Further, the second aromatic amide repeating unit may be a repeating unit represented by the following Chemical Formula 2.

[Chemical Formula 2]

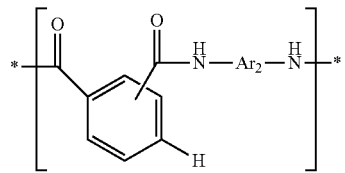

in Chemical Formula 2, Ar$_2$ is a substituted or unsubstituted arylene group having 6 to 20 carbon atoms, or a substituted or unsubstituted heteroarylene group having 2 to 20 carbon atoms.

In Chemical Formula 1 and Chemical Formula 2, Ar$_1$ and Ar$_2$ are the same as or different from each other and are each independently an arylene group having 6 to 20 carbon atoms that is substituted with one or more substituents selected from the group consisting of an alkyl group, a haloalkyl group and an amino group, and more preferably, it may be a 2,2'-bis(trifluoromethyl)-4,4'-biphenylene group.

More specifically, in Chemical Formula 1 and Chemical Formula 2, Ar$_1$ and Ar$_2$ may be a divalent organic functional group derived from an aromatic diamine monomer, and specific examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyldiamine (TFDB) or 2,2'-dimethyl-4,4'-diaminobenzidine.

The first polyamide segment may include a first aromatic amide repeating unit or a block composed thereof, and the second polyamide segment may include a second aromatic amide repeating unit or a block composed thereof.

The first polyamide segment may include a repeating unit represented by Chemical Formula 1, or a block composed thereof, and the second polyamide segment may include a repeating unit represented by Chemical Formula 2, or a block composed thereof.

Specific examples of the repeating unit represented by Chemical Formula 1 include a repeating unit represented by the following Chemical Formula 1-1.

[Chemical Formula 1-1]

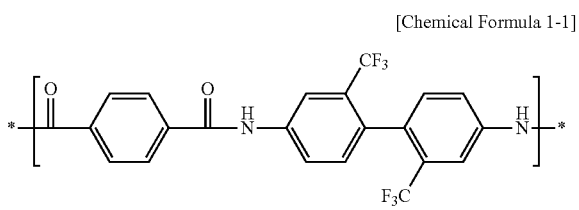

The first polyamide segment is an amide repeating unit derived from a combination of a 1,4-aromatic diacyl compound and an aromatic diamine compound. Due to the linear molecular structure, the chain packing and alignment can be kept constant in the polymer, and the surface hardness and mechanical properties of the polyamide resin film can be improved.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably, the 1,4-aromatic diacyl compound may include terephthaloyl chloride, or terephthalic acid, and the aromatic diamine compound may include 2,2'-bis(trifluoromethyl)-4,4'-biphenyldiamine.

The first polyamide segment may have a number average molecular weight of 100 g/mol or more and 5000 g/mol or less, or 100 g/mol or more and 3000 g/mol or less, or 100 g/mol or more and 2500 g/mol or less, or 100 g/mol or more and 2450 g/mol or less. When the number average molecular weight of the first polyamide segment is increased by more than 5000 g/mol, the chains of the first polyamide segment become excessively long and thus the crystallinity of the polyamide resin can be increased. Consequently, it may have a high haze value and it may be difficult to secure transparency. Examples of the measuring method of the number average molecular weight of the first polyamide segment is not limited, but for example, it can be confirmed through a small-angle X-ray scattering (SAXS) analysis.

The first polyamide segment may be represented by the following Chemical Formula 5.

[Chemical Formula 5]

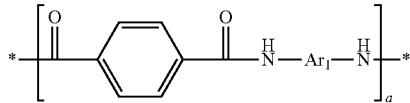

in Chemical Formula 5, Ar is a substituted or unsubstituted arylene group having 6 to 20 carbon atoms, or a substituted or unsubstituted heteroarylene group having 2 to 20 carbon atoms, and a is an integer of 1 to 5. In Chemical Formula 5, when a is 1, the Formula 5 may be a repeating unit represented by Chemical Formula 1. In Chemical Formula 5, when a is 2 to 5, the Formula 5 may be a block composed of repeating units represented by Chemical Formula 1. In Chemical Formula 5, the details concerning Ar includes those described above in Chemical Formula 1.

Based on the total repeating units contained in the polyamide resin, the ratio of the first aromatic amide repeating units may be 40 mol % to 95 mol %, 50 mol % to 95 mol %, or 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %.

In this manner, the polyamide resin in which the first aromatic amide repeating unit is contained in the above-described content can ensure a sufficient level of molecular weight, thereby ensuring excellent mechanical properties.

Meanwhile, the repeating unit represented by Chemical Formula 2 may include an amide repeating unit derived from a combination of a 1,3-aromatic diacyl compound and an aromatic diamine compound, or a repeating unit derived from a combination of a 1,2-aromatic diacyl compound and an aromatic diamine compound, or mixtures thereof, and it may include one type of repeating unit selected from a repeating unit represented by the following Chemical Formula 2-1; or a repeating unit represented by Chemical Formula 2-2.

[Chemical Formula 2-1]

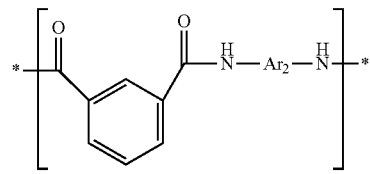

[Chemical Formula 2-2]

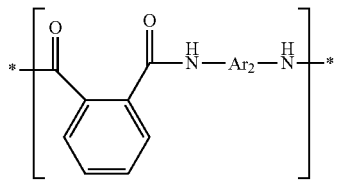

in Chemical Formulas 2-1 to 2-2, $Ar_2$ is a substituted or unsubstituted arylene group having 6 to 20 carbon atoms, or a substituted or unsubstituted heteroarylene group having 2 to 20 carbon atoms. The details concerning $Ar_2$ includes those described above in Chemical Formula 2.

The second aromatic amide repeating unit may include an amide repeating unit derived from a combination of a 1,3-aromatic diacyl compound and an aromatic diamine compound, or a repeating unit derived from a combination of a 1,2-aromatic diacyl compound and an aromatic diamine compound.

Specifically, the repeating unit represented by Chemical Formula 2-1 is an amide repeating unit derived from a combination of a 1,3-aromatic diacyl compound and an aromatic diamine compound, and the repeating unit represented by Chemical Formula 2-2 is an amide repeating unit derived from a combination of a 1,2-aromatic diacyl compound and an aromatic diamine compound.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably, the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

Specific examples of the repeating unit represented by Chemical Formula 2-1 include a repeating unit represented by the following Chemical Formula 2-4.

[Chemical Formula 2-4]

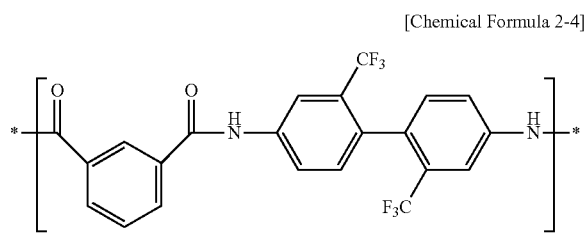

Specific examples of the repeating unit represented by Chemical Formula 2-2 include a repeating unit represented by the following Chemical Formula 2-5.

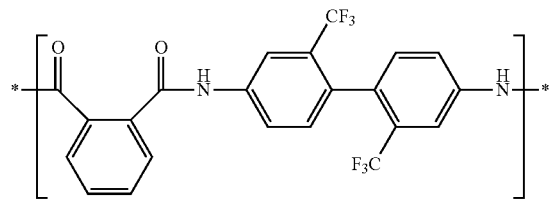

On the other hand, the second polyamide segment may be represented by the following Chemical Formula 6.

[Chemical Formula 6]

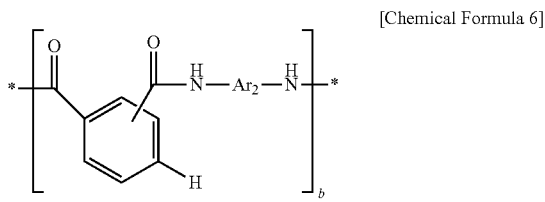

in Chemical Formula 6, $Ar_2$ is a substituted or unsubstituted arylene group having 6 to 20 carbon atoms, or a substituted or unsubstituted heteroarylene group having 2 to 20 carbon atoms, and b is an integer of 1 to 3, or 1 to 2. In Chemical Formula 6, when b is 1, the Chemical Formula 6 may be a repeating unit represented by Chemical Formula 2. In Chemical Formula 6, when b is 2 to 3, the Chemical Formula 6 may be a block composed of repeating units represented by Chemical Formula 2.

The second aromatic amide repeating unit is a repeating unit formed by an amidation reaction of isophthaloyl chloride, isophthalic acid or phthaloyl chloride, phthalic acid and an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide resin film. In addition, as this is included in the polyamide resin together with the repeating unit represented by Chemical Formula 1, it is possible to increase the molecular weight of the polyamide resin.

Based on the total repeating units contained in the polyamide resin, the ratio of the second aromatic amide repeating unit may be 5 mol % to 60 mol %, or 5 mol % to 50 mol %, or 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

In this manner, the polyamide resin in which the second aromatic amide repeating unit is contained in the above-described content can suppress the growth of the length of the chains consisting of only the first aromatic amide repeating unit and thus lower the crystallinity of the resin. Consequently, it is possible to have a low haze value and thus secure excellent transparency.

More specifically, based on the total repeating units contained in the polyamide resin, the content of the repeating unit represented by Chemical Formula 1 may be 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %, and the content of the repeating unit represented by Chemical Formula 2 may be 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

That is, the polyamide resin can increase the molar content of the repeating unit represented by Chemical Formula 1 and thus maximize the effect of improving the surface hardness and mechanical properties of the polyamide film according to the chain packing and alignment within the polymer due to the linear molecular structure of the repeating unit represented by Chemical Formula 1. In addition, although the repeating unit represented by Chemical Formula 2 has a relatively low molar content, it may suppress the length growth of the chain consisting of only the specific repeating unit represented by Chemical Formula 1, thereby lowering the crystallinity of the resin. Consequently, it is possible to have a low haze value and thus secure excellent transparency.

On the other hand, the polyamide resin may include a backbone chain formed by alternative bonding of the first polyamide segment and the second polyamide segment.

That is, the backbone chain of the polyamide resin may form a polymer chain consisting of alternating structure of the first polyamide segment and the second polyamide segment. In other words, the second polyamide segment is positioned between the first polyamide segments, and may serve to suppress the growth of the length of the first polyamide segment.

In this manner, when the growth of the length of the first polyamide segment is suppressed, the haze value of the polyamide resin can be remarkably lowered while the crystal properties of the first polyamide segment are reduced, thereby achieving excellent transparency.

Meanwhile, "the backbone chain of the polyamide resin forms a polymer chain consisting of alternating structure of a first polyamide segment and a second polyamide segment" is considered to be due to the formation of a melt-kneaded complex in the preparation method of the polyamide resin.

Specifically, the backbone chain of the polyamide resin may include an alternating repeating unit represented by the following Chemical Formula 3.

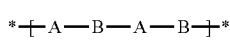

in Chemical Formula 3, A is the first polyamide segment, and B is the second polyamide segment.

That is, the first polyamide segment and the second polyamide segment may form a backbone chain including an alternating repeating unit represented by the following Chemical Formula 3.

More specifically, the alternating repeating unit represented by Chemical Formula 3 may be a repeating unit represented by the following Chemical Formula 4.

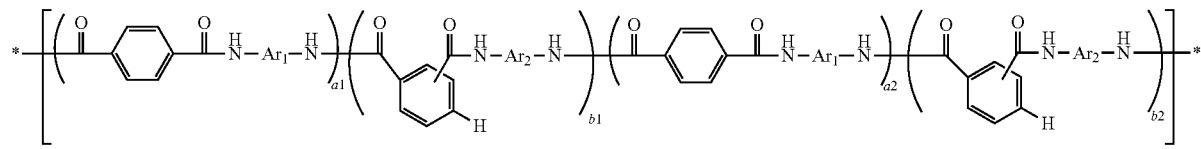

in Chemical Formula 4, $Ar_1$ and $Ar_2$ are each independently a substituted or unsubstituted arylene group having 6 to 20 carbon atoms, or a substituted or unsubstituted heteroarylene group having 2 to 20 carbon atoms, a1 and a2 are the same as or different from each other and are each independently an integer of 1 to 10, or 1 to 5, and b1 and b2 are the same as or different from each other and are each independently an integer of 1 to 5, or 1 to 3.

Including the alternating repeating unit represented by Chemical Formula 3 in the backbone chain of the polyamide resin can be confirmed through the haze value of the polyamide resin, and more specifically, it can be confirmed through a small-angle X-ray scattering (SAXS) analysis.

That is, the polyamide resin may include a first polyamide segment containing a repeating unit represented by Chemical Formula 1 or a block comprised thereof; and a second polyamide segment containing a repeating unit represented by Chemical Formula 2, or a block comprised thereof, wherein the first polyamide segment and the second polyamide segment may form a backbone chain containing the alternating repeating unit represented by Chemical Formula 3.

The polyamide resin may have a weight average molecular weight of 330000 g/mol or more, 420000 g/mol or more, or 500000 g/mol or more, 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol.

The reason why the weight average molecular weight of the polyamide resin is measured to be high is considered to be due to the formation of a melt-kneaded complex in the preparation method of the polyamide resin of another embodiment of the present invention described hereinafter. When the weight average molecular weight is reduced to less than 330,000 g/mol, the polyamide resin has a problem that mechanical properties such as flexibility and pencil hardness are lowered.

The polydispersity index of the polyamide resin may be 3.0 or less, or 2.9 or less, or 2.8 or less, or 1.5 to 3.0, or 1.5 to 2.9, or 1.6 to 2.8, or 1.8 to 2.8. Through such narrow range of polydispersity index, the polyamide resin can improve mechanical properties such as bending properties or hardness properties. When the polydispersity index of the polyamide resin becomes too wide by more than 3.0, there is a limit that it is difficult to improve the above-described mechanical properties to a sufficient level.

The haze of the polyamide resin measured according to ASTM D1003 may be 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze of the polyamide resin measured according to ASTM D1003 is increased by more than 3.0%, the opacity is increased and thus it is difficult to secure a sufficient level of transparency.

Preferably, the polyamide resin satisfies the weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol, and simultaneously it may have the haze measured according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%.

The relative viscosity of the polyamide resin (measured according to ASTM D 2196) may be 45000 cps or more, or 60000 cps or more, or 45000 cps to 500000 cps, or 60000 cps to 500000 cps, or 70000 cps to 400000 cps, or 80000 cps to 300000 cps, or 100000 cps to 200000 cps, or 110000 cps to 174000 cps. When the relative viscosity of the polyamide resin (measured according to ASTM D 2196) is reduced to less than 45000 cps, there is a limit that in the film molding process using the polyamide resin, the molding processability is lowered and the efficiency of the molding process is lowered.

As an example of a method for preparing the polyamide resin, a method for preparing a polyamide resin including a step of melt-kneading a compound represented by the following Chemical Formula 7 and a compound represented by the following Chemical Formula 8, and solidifying the melt-kneaded product to form a complex; and a step of reacting the complex with an aromatic diamine monomer can be used.

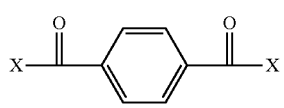

[Chemical formula 8]

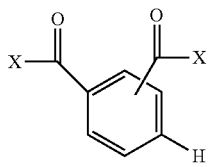

in Chemical Formulas 7 to 8, X is a halogen or a hydroxyl group.

The present inventors have found through experiments that when the compound represented by Chemical Formula 7 and the compound represented by Chemical Formula 8 are mixed at a temperature equal to or higher than the melting point as in the method for preparing the polyamide resin, it is possible to prepare a complex of monomers mixed uniformly through the melting of the compound represented by Chemical Formula 7 and the compound represented by Chemical Formula 8, and that as this complex is reacted with an aromatic diamine monomer, an amide repeating unit derived from the compound represented by Chemical Formula 7, or a block composed thereof, and an amide repeating uniting derived from the compound represented by Chemical Formula 8, or a block composed thereof can be alternatively polymerized, thereby completing the present invention.

That is, the polyamide resin of one embodiment can be obtained by the preparation method of the polyamide resin.

Specifically, each of the compound represented by Chemical Formula 7 and the compound represented by Chemical Formula 8 exhibits different aspects in solubility and reactivity due to chemical structural differences. Therefore, even when they are added simultaneously, there is a limit in that the amide repeating unit derived from the compound represented by Chemical Formula 7 is predominantly formed and simultaneously long blocks are formed, thereby increasing the crystallinity of the polyamide resin and making it difficult to secure transparency.

Thus, in the preparation method of the polyamide resin, the compound represented by Chemical Formula 7 and the compound represented by Chemical Formula 8 are not simply physically mixed, but through the formation of a complex by melt-kneading at a temperature higher than each melting point, each monomer was induced to react relatively evenly with the aromatic diamine monomer.

Meanwhile, when synthesizing existing polyamide resin, as the compound represented by Chemical Formula 7 and the compound represented by Chemical Formula 8 are dissolved in a solvent and then reacted with an aromatic diamine monomer in a solution state, there was a limit in that due to the deterioration by moisture or mixing in solvents, the molecular weight of the finally synthesized polyamide resin decreases. Further, due to the difference in the solubility of the compound represented by Chemical Formula 7 and the compound represented by Chemical Formula 8, the amide repeating unit derived from the compound represented by Chemical Formula 7 is predominantly formed and simultaneously long blocks are formed, thereby increasing the crystallinity of the polyamide resin and making it difficult to secure transparency.

Thus, in the preparation method of the polyamide resin, as a complex obtained by melt-kneading the compound represented by Chemical Formula 7 and the compound represented by Chemical Formula 8 are reacted with the aromatic diamine monomer dissolved in the organic solvent in the form of a solid powder through cooling at a temperature lower than each melting point (minus 10° C. to plus 30° C., or 0° C. to plus 30° C., or plus 10° C. to plus 30° C.), it was confirmed that the molecular weight of the finally synthesized polyamide resin is improved, and it was confirmed therefrom that excellent mechanical properties are secured.

Specifically, the method for preparing the polyamide resin may include melt-kneading the compound represented by Chemical Formula 7 and the compound represented by Chemical Formula 8, and solidifying the melt-kneaded product to form a complex.

In the compound represented by Chemical Formula 7, X is a halogen or a hydroxyl group. Preferably, in Chemical Formula 7, X is chlorine. Specific examples of the compound represented by Chemical Formula 7 include terephthaloyl chloride or terephthalic acid.

The compound represented by Chemical Formula 7 may form a repeating unit represented by Chemical Formula 1 by an amidation reaction of an aromatic diamine monomer. Due to the linear molecular structure, the chain packing and alignment can be kept constant in the polymer, and the surface hardness and mechanical properties of the polyamide resin film can be improved.

In the compound represented by Chemical Formula 8, X is a halogen or a hydroxyl group. Preferably, in Chemical Formula 8, X is chlorine. Specific examples of the compound represented by Chemical Formula 8 include phthaloyl chloride, phthalic acid, isophthaloyl chloride, or isophthalic acid.

The compound represented by Chemical Formula 8 may form a repeating unit represented by Chemical Formula 2 by an amidation reaction of an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide resin film. In addition, as the repeating unit represented by Chemical Formula 2 derived from the compound represented by Chemical Formula 8 is included in the polyamide resin together with the repeating unit represented by Chemical Formula 1, it is possible to increase the molecular weight of the polyamide resin.

Meanwhile, in the step of melt-kneading a compound represented by Chemical Formula 7 and a compound represented by Chemical Formula 8, and solidifying the melt-kneaded product to form a complex, the melt-kneading means mixing the compound represented by Chemical Formula 7 and the compound represented by Chemical Formula 8 at a temperature equal to or higher than the melting point.

In this manner, the compound represented by Chemical Formula 7 and the compound represented by Chemical Formula 8 are not simply physically mixed, but through the formation of a complex by melt-kneading at a temperature higher than each melting point, each monomer can be induced to react relatively evenly with the aromatic diamine monomer.

Thereby, due to the difference in the solubility of the compound represented by Chemical Formula 7 and the compound represented by Chemical Formula 8, the amide repeating unit derived from the compound represented by Chemical Formula 7 is predominantly formed and simultaneously long blocks are formed, thereby increasing the crystallinity of the polyamide resin and making it difficult to secure transparency. Therefore, in order to solve these limitations, the first polyamide segment and the second polyamide segment can alternately form a backbone chain including the alternating repeating units represented by Chemical Formula 3 as in one embodiment.

At this time, with respect to 100 parts by weight of the compound represented by Chemical Formula 7, the compound represented by Chemical Formula 8 may be mixed at 5 parts by weight to 60 parts by weight, or 5 parts by weight to 50 parts by weight, or 5 parts by weight to 25 parts by weight, or 10 parts by weight to 30 parts by weight, or 15 parts by weight to 25 parts by weight. Thereby, the technical effect of increasing transmittance and clarity can be realized. When the compound represented by Chemical Formula 8 is mixed in an excessively small amount of less than 5 parts by weight with respect to 100 parts by weight of the compound represented by Chemical Formula 7, the technical problems such as becoming opaque and the increase of haze may occur. When the compound represented by Chemical Formula 8 is mixed in an excessively high amount of more than 60 parts by weight with respect to 100 parts by weight of the compound represented by Chemical Formula 7, the technical problems such as the reduction of physical properties (hardness, tensile strength, etc.) may occur.

In addition, in forming the complex by solidifying the melt-kneaded product, the solidifying means a physical change in which the melt-kneaded product in a molten state is cooled to a temperature equal to or less than the melting point and solidified. Consequently, the formed complex may be in a solid state. More preferably, the complex may be a solid powder obtained through an additional grinding process or the like.

Meanwhile, the step of melt-kneading a compound represented by Chemical Formula 7 and a compound represented by Chemical Formula 8, and solidifying the melt-kneaded product to form a complex may include a step of mixing the compound represented by Chemical Formula 7 and the compound represented by Chemical Formula 8 at a temperature of 50° C. or higher; and a step of cooling the result of the mixing step.

The terephthaloyl chloride has a melting point of 81.3° C. to 83° C., the isophthaloyl chloride has a melting point of 43° C. to 44° C., and the phthaloyl chloride may have a melting point of 6° C. to 12° C. Thereby, when these are mixed at a temperature of 50° C. or higher, or 90° C. or higher, or 50° C. to 120° C., or 90° C. to 120° C., or 95° C. to 110° C., or 100° C. to 110° C., these are the temperature condition higher than the melting point of both the compound represented by Chemical Formula 7 and the compound represented by Chemical Formula 8 and thus, melt-kneading may be performed.

In the step of cooling the result of the mixing step, the result of the melt-kneading step is left at plus 5° C. or below, or minus 10° C. to plus 5° C., or minus 5° C. to plus 5° C., which is a temperature condition lower than the melting point of both the compound represented by Chemical Formula 7 and the compound represented by Chemical Formula 8, so that a more uniform solid powder can be obtained through cooling.

Meanwhile, after the step of cooling the result of the mixing step, the method may further include a step of grinding the result of the cooling step. Through the grinding step, a solid complex can be prepared in powder form, and the powder obtained after the grinding step may have an average particle size of 1 mm to 10 mm.

Grinders used for grinding with such particle sizes specifically include a pin mill, a hammer mill, a screw mill, a roll mill, a disc mill, a jog mill or sieve, a jaw crusher, and the like, but are not limited to the examples described above.

In this manner, as the melt mixture of the compound represented by Chemical Formula 7 and the compound represented by Chemical Formula 8 is reacted with the aromatic diamine monomer in the form of solids, specifically solid powders, through the cooling at a temperature lower than the melting point, the deterioration of the compound represented by Chemical Formula 7 and the compound represented by Chemical Formula 8 due to moisture or their mixing in solvents is minimized, the molecular weight of the finally synthesized polyamide resin is increased, and thereby excellent mechanical properties of the polyamide resin can be ensured.

In addition, after the step of melt-kneading a compound represented by the following Chemical Formula 7 and a compound represented by the following Chemical Formula 8, and solidifying the melt-kneaded product to form a complex, the method for preparing the polyamide resin may include a step of reacting the complex with an aromatic diamine monomer.

The reaction in the step of reacting the complex with an aromatic diamine monomer may be performed under an inert gas atmosphere at a temperature condition of minus 25° C. to plus 25° C. or a temperature condition of minus 25° C. to 0° C.

Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

More preferably, as the aromatic diamine monomer, 2,2'-bis(trifluoromethyl)-4,4'-biphenyldiamine (TFDB), 2,2'-dimethyl-4,4'-diaminobenzidine, m-xylylenediamine, or p-xylylenediamine can be used.

More specifically, the step of reacting the complex with an aromatic diamine monomer may include a step of dissolving the aromatic diamine monomer in an organic solvent to prepare a diamine solution; and a step of adding a complex powder to the diamine solution.

In the step of dissolving the aromatic diamine monomer in an organic solvent to prepare a diamine solution, the aromatic diamine monomer included in the diamine solution may be present in a state dissolved in an organic solvent. Examples of the solvent are not particularly limited, but for example, common general-purpose organic solvents such as N-methylformamide, N,N-dimethylformamide, N,N-diethylformamide, N,N-dimethylacetamide, N,N-diethylacetamide, N,N-dimethylpropionamide, 3-methoxy-N,N-dimethylpropionamide, dimethyl sulfoxide, acetone, N-methyl-2-pyrrolidone, N-ethyl-2-pyrrolidone, tetrahydrofuran, chloroform, gamma-butyrolactone, ethyl lactate, methyl 3-methoxypropionate, methyl isobutyl ketone, toluene, xylene, methanol, ethanol, or the like can be used without limitation.

In the step of adding a complex powder to the diamine solution, the complex powder will react with the aromatic diamine monomer dissolved in the diamine solution. As a result, the deterioration of the compound represented by Chemical Formula 7 and the compound represented by Chemical Formula 8 due to moisture, or their mixing in solvents is minimized, the molecular weight of the finally synthesized polyamide resin is increased, and thereby excellent mechanical properties of the polyamide resin can be ensured.

After the step of cooling the result of the mixing step, the complex powder can be prepared into a complex of solids in the form of powder through the step of grinding the result of the cooling step. The powder obtained after the grinding step may have an average particle size of 1 mm to 10 mm.

Meanwhile, the polyamide resin film of one embodiment may further include an ultraviolet light stabilizer dispersed in the polyamide resin. The ultraviolet light stabilizer is a material added for the UV stability, and various substances that are commercially available, such as Tinuvin 144, Tinuvin 292, Tinuvin 327, Tinuvin 329, Tinuvin 5050, Tinuvin 5151 from BASF Corporation, and LOWILITE 22 and LOWILITE 26, LOWILITE 55, LOWILITE 62, LOWILITE 94 from Miwon Commercial Co., etc. can be used, but the present invention is not limited thereto.

However, in the polyamide resin film of the embodiment, only one type of a triazine-based UV absorber, a triazole-based UV absorber, and a HALS (hindered amine light stabilizer)-based UV absorber and the like may be used as the ultraviolet light stabilizer, or two or more types may be used together.

The triazine-based UV absorber may include commercially available Tinuvin 360, Tinuvin 1577 (Ciba Chemicals), Cyasorb UV-1164, Cyasorb UV-2908, Cyasorb UV-3346 (Cytec), Tinuvin T1600 (BASF), LA-F70 (ADEKA), and the like, the triazole-based UV absorber may include Tinuvin 329, Tinuvin 384, Tinuvin 1130, Cyasorb UV-2337, Cyasorb UV-5411, Eversorb 109 (Everlight Chemical), and the like, and the HALS-based UV absorber may include Cyasorb UV-3853 and the like.

In particular, when using a triazole-based UV absorber, not only excellent light resistance but also stable optical properties can be achieved, and the triazole-based UV absorber may include a compound represented by the following Chemical Formula 11.

[Chemical Formula 11]

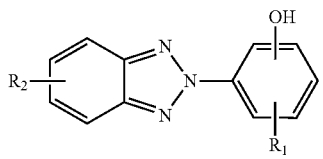

in Chemical Formula 11, $R_1$ and $R_2$ are each independently hydrogen or an alkyl group having 1 to 20 carbon atoms. More preferably, in Chemical Formula 1, Tinuvin 329 (BASF) wherein $R_1$ is 2,4,4-trimethylpentan-2-yl and $R_2$ is hydrogen, may be mentioned.

The ultraviolet light stabilizer may be added in an amount of about 0.1 part by weight to about 20 parts by weight or about 1 part by weight to about 10 parts by weight based on 100 parts by weight of the polyamide resin. This is because when the content of the ultraviolet light stabilizer satisfies the above range, both the optical properties of the film and the UV-shielding effect are excellent.

When the ultraviolet light stabilizer is added in an excessively small amount compared to the polyamide resin, it is difficult to sufficiently realize UV light resistance by the ultraviolet light stabilizer, When the ultraviolet light stabilizer is added in an excessive amount compared to the polyamide resin, the initial yellowness index of the polyamide resin film is higher than the reference value and simultaneously, transparency of the film can be decreased.

II. Resin Laminate

According to the other aspect of the present invention, there can be provided a resin laminate including a substrate including the polyamide resin film of one embodiment; and a hard coating layer formed on at least one side of the substrate.

The substrate may include the polyamide resin film of one embodiment, and the details concerning the polyamide resin film may include all of those described in the one embodiment.

A hard coating layer may be formed on at least one side of the substrate. A hard coating layer may be formed on one side or both sides of the substrate. When the hard coating layer is formed only on one side of the substrate, a polyamide resin film including one or more polymers selected from the group consisting of polyimide-based, polycarbonate-based, polyester-based, polyalkyl(meth)acrylate-based, polyolefin-based and polycyclic olefin-based polymers may formed on the opposite side of the substrate.

The hard coating layer may have a thickness of 0.1 μm to 100 μm.

The hard coating layer can be used without particular limitation as long as it is a material known in the field of hard coating. For example, the hard coating layer may include a binder resin of photocurable resin; and inorganic particles or organic particles dispersed in the binder resin.

The photocurable resin contained in the hard coating layer is a polymer of a photocurable compound which can cause a polymerization reaction when irradiated with light such as ultraviolet rays, and may be one conventionally used in the art. However, preferably, the photocurable compound may be a polyfunctional (meth)acrylate-based monomer or oligomer. At this time, it is advantageous in terms of ensuring the physical properties of the hard coating layer that the number of (meth)acrylate-based functional groups is 2 to 10, 2 to 8, or 2 to 7. Alternatively, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The inorganic particles may be, for example, silica, metal atoms such as aluminum, titanium, or zinc, or oxides or nitrides thereof. Silica fine particles, aluminum oxide particles, titanium oxide particles, zinc oxide particles, and the like can be used independently of each other.

The inorganic particles may have an average radius of 100 nm or less, or 5 to 100 nm. The type of the organic particles is not limited, and for example, polymer particles having an average particle size of 10 nm to 100 μm may be used.

The resin laminate can be used as a substrate or a cover window of a display device, or the like. It has high flexibility and bending durability together with high transmittance and low haze properties, so that it can be used as a substrate or cover window of a flexible display device. That is, the display device including the resin laminate, or the flexible display device including the resin laminate may be implemented.

According to the present invention, there can be provided a polyamide resin film that can secure at least an adequate level of mechanical properties and transparency while improving the UV shielding function, and a resin laminate using the same.

BRIEF DESCRIPTION OF DRAWINGS

FIG. 1 shows a $^{13}$C-NMR spectrum of the polyamide resin obtained in (1) of Example 1.

FIG. 2 shows a $^{13}$C-NMR spectrum of the polyamide resin obtained in (1) of Example 2.

Hereinafter, embodiments of the present invention will be described in more detail by way of examples. However, these examples are presented for illustrative purposes only, and are not intended to limit the scope of the present invention.

PREPARATION EXAMPLE: PREPARATION OF ACYL CHLORIDE COMPLEX

Preparation Example 1

549.4 g (2.704 mol) of terephthaloyl chloride (TPC; melting point: 83° C.) and 120.6 g (0.594 mol) of isophthaloyl chloride (IPC; melting point: 44° C.) were added to a 1000 mL 4-neck round flask (reactor) equipped with a stirrer, a nitrogen injection device, a dropping funnel and a temperature controller, and the mixture was melt-kneaded at 100° C. for 3 hours and then cooled at 0° C. for 12 hours to prepare a complex of acylchloride (specifically, terephthaloyl chloride and isophthaloyl chloride).

Subsequently, the acyl chloride complex was grinded with a jaw crusher to prepare a powder having an average particle size of 5 mm.

Preparation Example 2

An acylchloride complex was prepared in the same manner as in Preparation Example 1, except that 569.5 g (2.803 mol) of terephthaloyl chloride (TPC; melting point: 83° C.) and 100.5 g (0.495 mol) of isophthaloyl chloride (IPC; melting point: 44° C.) were added.

EXAMPLE: PREPARATION OF POLYAMIDE RESIN AND FILM

Example 1

(1) Polyamide Resin 262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and 14.153 g (0.0442 mol) of 2,2'-bis(trifluoromethyl)-4,4'-biphenyldiamine (TFDB) was added and dissolved.

8.972 g (0.0442 mol) of the acyl chloride complex powder obtained in Preparation Example 1 was added thereto and stirred, and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

It was confirmed through $^{13}$C-NMR shown in FIG. 1 that the polyamide resin obtained in (1) of Example 1, contained 82 mol % of the first repeating unit obtained by an amide reaction of terephthaloyl chloride (TPC) and 2,2'-bis(trifluoromethyl)-4,4'-biphenyldiamine (TFDB) and 18 mol % of the second repeating unit obtained by an amide reaction of isophthaloyl chloride (IPC) and 2,2'-bis(trifluoromethyl)-4,4'-biphenyldiamine (TFDB).

(2) Polyamide Resin Film

The polyamide resin obtained in (1) of Example 1, and Tinuvin 329 (UV blocking agent) 5 phr (5 parts by weight relative to 100 parts by weight of polyamide resin) were dissolved in N,N-dimethylacetamide to prepare about 10% (w/v) polymer solution.

The polymer solution was applied onto a polyimide substrate film (UPILEX-75s, UBE), and the thickness of the polymer solution was uniformly adjusted using a film applicator.

Then, after drying for 15 minutes at 80° C. Mathis oven, it was cured at 250° C. for 30 minutes while flowing nitrogen, and then peeled from the substrate film to obtain a polyamide resin film (thickness: 50 µm).

Example 2

(1) Polyamide Resin

A polyamide resin was prepared in the same manner as in (1) of Example 1, except that the acyl chloride complex powder obtained in Preparation Example 2 was used instead of the acyl chloride complex powder obtained in Preparation Example 1.

It was confirmed through $^{13}$C-NMR shown in FIG. 2 that the polyamide resin obtained in (1) of Example 2, contained 85 mol % of the first repeating unit obtained by an amide reaction of terephthaloyl chloride (TPC) and 2,2'-bis(trifluoromethyl)-4,4'-biphenyldiamine (TFDB), and 15 mol % of the second repeating unit obtained by an amide reaction of isophthaloyl chloride (IPC) and 2,2'-bis(trifluoromethyl)-4,4'-biphenyldiamine (TFDB).

(2) Polyamide Resin Film

A polyamide resin film (thickness: 50 µm) was prepared in the same manner as in (2) of Example 1, except that the polyamide resin obtained in (1) of Example 2 was used instead of the polyamide resin obtained in (1) of Example 1.

Example 3

A polyamide resin film (thickness: 50 µm) was prepared in the same manner as in Example 2, except that Tinuvin 329 as a UV blocking agent was used at 4 phr (4 parts by weight relative to 100 parts by weight of polyamide resin).

COMPARATIVE EXAMPLE: PREPARATION OF POLYAMIDE RESIN AND FILM

Comparative Example 1

A polyamide resin and a polyamide resin film (thickness: 50 µm) were prepared in the same manner as in Example 1, except that Tinuvin 329 was not added as the UV blocking agent.

Comparative Example 2

A polyamide resin and a polyamide resin film (thickness: 49 µm) were prepared in the same manner as in Example 2, except that Tinuvin 329 was not added as the UV blocking agent.

REFERENCE EXAMPLE: PREPARATION OF POLYAMIDE RESIN

Reference Example 1

A polyamide resin was prepared in the same manner as in (1) of Example 1, except that instead of the acyl chloride complex powder obtained in Preparation Example 1, 7.358 g (0.0362 mol) of terephthaloyl chloride (TPC) and 1.615 g (0.0080 mol) of isophthaloyl chloride (IPC) were added simultaneously to perform an amide formation reaction.

Reference Example 2

A polyamide resin was prepared in the same manner as in (1) of Example 1, except that instead of the acyl chloride complex powder obtained in Preparation Example 1, 7.358 g (0.0362 mol) of terephthaloyl chloride (TPC) was first added, and then 1.615 g (0.0080 mol) of isophthaloyl chloride (IPC) was added sequentially at about 5 minute intervals to perform an amide formation reaction.

Reference Example 3

A polyamide resin was prepared in the same manner as in (1) of Example 1, except that instead of the acyl chloride complex powder obtained in Preparation Example 1, 1.615 g (0.0080 mol) of isophthaloyl chloride (IPC) was first added, and then 7.358 g (0.0362 mole of terephthaloyl chloride (TPC) was added sequentially at about 5 minute intervals to perform an amide formation reaction.

Reference Example 4

262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and then 7.358 g(0.0362 mol) of terephthaloyl chloride (TPC) and 1.615 g(0.0080 mol) of isophthaloyl chloride (IPC) were added and dissolved.

14.153 g (0.0442 mol) of 2,2'-bis(trifluoromethyl)-4,4'-biphenyldiamine (TFDB) in powder form was added thereto and stirred, and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

Experimental Example 1

The following characteristics were measured or evaluated for the polyamide resin films obtained in the above examples and comparative examples, and the results are shown in Table 1 below.
(1) Thickness: The thickness of the polyamide resin film was measured using a thickness measuring device.
(2) Yellowness index (Y.I.): The yellowness index of the polyamide resin film was measured according to the measurement method of ASTM E313 using a COH-400 Spectrophotometer (NIPPON DENSHOKU INDUSTRIES).
(3) Transmittance: The total light transmittance of the polyamide resin film was measured using a Shimadzu UV-2600 UV-vis spectrometer. In the measurement results, the transmittance (T, @388 nm) of ultraviolet light with a wavelength of 388 nm and the transmittance (T, @550 nm) of visible light with a wavelength of 550 nm were shown.
(4) Haze: The haze value of the polyamide resin film was measured according to the ASTM D1003 test method using a COH-400 Spectrophotometer (NIPPON DENSHOKU INDUSTRIES).
(5) Bending Property: The folding endurance of the polyamide resin film was evaluated using an MIT type folding endurance tester. Specifically, a specimen (1 cm*7 cm) of the polyamide resin film was loaded into the folding endurance tester, and folded to an angle of 1350 at a rate of 175 rpm on the left and right sides of the specimen, with a radius of curvature of 0.8 mm and a load of 250 g, until the specimen was bended and fractured. The number of reciprocating bending cycles was measured as the folding endurance.
(6) Pencil Hardness: The pencil hardness of the polyamide resin film was measured according to the ASTM D3363 test method using a Pencil Hardness Tester. Specifically, varying hardness values of pencils were fixed to the tester and scratched on the polyamide resin film, and the degree of occurrence of a scratch on the polyamide resin film was observed with the naked eye or with a microscope. When more than 70% of the total number of scratches were not observed, a value corresponding to the hardness of the pencil was evaluated as the pencil hardness of the polyamide resin film.

The pencil hardness is increased in the order of B grade, F grade and H grade. Within the same grade, the higher the number, the higher the hardness. Within the grade, the higher the number, the higher the hardness.
(7) UV-cut off wavelength ($\lambda$) and UV-cut slope (dT/d$\lambda$): The UV-cut off wavelength ($\lambda$) and UV-cut slope (dT/d$\lambda$) of the polyamide resin film were measured according to the ASTM E424 test method using a UV-Vis spectrophotometer (manufacturer: Shimadzu, model: UV2600). The UV-cut slope (dT/d$\lambda$) was measured in the range of 10% to 80% transmittance, and the UV-cut off wavelength was expressed as the wavelength when the transmittance was less than 1%.

TABLE 1

| Category | Example 1 | Example 2 | Example 3 | Comparative Example 1 | Comparative Example 2 |
|---|---|---|---|---|---|
| Thickness(μm) | 50 | 50 | 50 | 50 | 49 |
| Y.I. | 2.60 | 3.08 | 2.90 | 2.68 | 2.89 |
| T (%)@550 nm | 88.93 | 88.32 | 88.09 | 88.75 | 88.50 |
| T (%)@388 nm | 13.5 | 11.1 | 11.7 | 75.3 | 71.0 |
| Haze(%) | 0.45 | 0.76 | 0.82 | 0.81 | 0.97 |
| Bending property (Cycle) | 13521 | 10225 | 9983 | 12022 | 9785 |
| Pencil hardness | 3H | 4H | 4H | 3H | 4H |
| UV-cut slope (dT/d$\lambda$)@10% | 3.09 | 2.45 | 2.48 | 2.90 | 2.45 |
| UV-cut slope (dT/d$\lambda$)@80% slope | 1.04 | 0.68 | 0.68 | 0.36 | 0.68 |
| UV-cut slope (dT/d$\lambda$) maximum value @10~80% | 5.48 | 3.67 | 3.67 | 4.56 | 3.67 |

TABLE 1-continued

| Category | Example 1 | Example 2 | Example 3 | Comparative Example 1 | Comparative Example 2 |
|---|---|---|---|---|---|
| UV-cut slope (dT/dλ) minimum value @10~80% | 1.04 | 0.68 | 0.68 | 0.35 | 0.68 |

As shown in Table 1, it was confirmed that in the case of the polyamide resin films obtained in Examples, not only a transmittance (T, @388 nm) of ultraviolet light with a wavelength of 388 nm at a thickness of approximately 50 μm is as low as 11.1% to 13.5%, but also an UV-cut slope is as high as 0.68 or more and 1.04 or less in the range of 10% to 80% transmittance, thereby having colorless and transparent optical properties together with excellent UV shielding function.

On the other hand, it was confirmed that in the case of the polyamide resin films obtained in Comparative Examples, a transmittance (T, @388 nm) of ultraviolet light with a wavelength of 388 nm at a thickness of approximately 50 μm is 71% to 75.3% which is greatly increased compared to Examples, and that in the case of Comparative Example 1, it has an UV-cut slope of 0.36 which is lower than that of Examples, thereby exhibiting low UV shielding function and the like.

Experimental Example 2

The following characteristics were measured or evaluated for the polyamide resins obtained in the above examples and reference examples, and the films obtained therefrom, and the results are shown in Table 2 below.

(1) Thickness: The thickness of the film was measured using a thickness measuring device.
(2) Haze: The haze value of the polyamide resin film was measured according to the ASTM D1003 test method using a COH-400 Spectrophotometer (NIPPON DENSHOKU INDUSTRIES).
(3) Molecular weight and polydispersity index (PDI): The weight average molecular weight (Mw) and the number average molecular weight (Mn) of the polyamide resin were measured by gel permeation chromatography (GPC, manufactured by Waters), and the polydispersity index (PDI) was calculated by dividing the weight average molecular weight by the number average molecular weight. Specifically, the measurement was performed using a 600 mm long column connecting two Polymer Laboratories PLgel MIX-B Columns (300 mm in length), through Waters 2605 Refractive Index (RI) Detector, wherein the evaluation temperature was 50 to 75° C. (about 65° C.), DMF 100 wt % solvent was used, the flow rate was 1 mL/min, and the sample was prepared at a concentration of 1 mg/mL and supplied in an amount of 100 μL for 25 minutes. The molecular weights could be determined using calibration curves formed using polystyrene standards. As the molecular weight of polystyrene standard products, 7 types of 3940/9600/31420/113300/327300/1270000/4230000 were used.
(4) Bending Property: The folding endurance of the films obtained from the polyamide resins was evaluated using an MIT type folding endurance tester. Specifically, a specimen (1 cm*7 cm) of the films obtained from the polyamide resins was loaded into the folding endurance tester, and folded to an angle of 1350 at a rate of 175 rpm on the left and right sides of the specimen, with a radius of curvature of 0.8 mm and a load of 250 g, until the specimen was bended and fractured. The number of reciprocating bending cycles was measured as the folding endurance.
(5) Viscosity: Under a constant reflux system at 25±0.2° C., the viscosity of the solution containing polyamide resin (solvent: dimethylacetamide (DMAc), solid content: 10 wt %) was measured according to ASTM D 2196: test method of non-Newtonian materials by Brookfield DV-2T Rotational Viscometer. As Brookfield silicone standard oil, a number of standard solutions having a viscosity range of 5000 cps to 200000 cps was used. The measurement was performed with a spindle LV-4 (64), 0.3-100 RPM, and the unit was cps (mPa·s).
(6) Pencil Hardness: The pencil hardness of the films obtained from the polyamide resins was measured according to the ASTM D3363 test method using a Pencil Hardness Tester. Specifically, varying hardness values of pencils were fixed to the tester and scratched on the polyamide resin film, and the degree of occurrence of a scratch on the films obtained from the polyamide resins was observed with the naked eye or with a microscope. When more than 70% of the total number of scratches were not observed, a value corresponding to the hardness of the pencil was evaluated as the pencil hardness of the polyamide resin film.

The pencil hardness is increased in the order of B grade, F grade and H grade. Within the same grade, the higher the number, the higher the hardness. Within the grade, the higher the number, the higher the hardness.

TABLE 2

| Category | Example 1 | Example 2 | Reference Example 1 | Reference Example 2 | Reference Example 3 | Reference Example 4 |
|---|---|---|---|---|---|---|
| Thickness(μm) | 50 | 49 | 51 | 51 | 50 | 50 |
| Y.I. | 2.68 | 2.89 | 8.55 | 25.10 | 4.59 | 2.28 |
| T (%)@550 nm | 88.75 | 88.50 | 85.63 | 75.94 | 87.57 | 88.82 |
| T (%)@388 nm | 75.3 | 71.0 | 51.01 | 31.62 | 65.04 | 74.24 |
| Haze(%) | 0.81 | 0.97 | 3.43 | 24.21 | 1.61 | 0.40 |
| Mw(g/mol) | 512000 | 463000 | 412000 | 350000 | 382000 | 321000 |
| Bending property (Cycle) | 12022 | 9785 | 5210 | 785 | 4513 | 6351 |
| PDI | 1.84 | 2.71 | 2.05 | 2.02 | 1.98 | 2.00 |
| Viscosity (cps) | 110000 | 174000 | 54000 | 24000 | 28000 | 18000 |
| Pencil hardness | 3 H | 4 H | 1 H | F | 1 H | 2 H |

Looking at Table 2 above, the polyamide resin of Examples prepared using the acyl chloride composite powder according to Preparation Examples 1 to 2 had a high weight average molecular weight of 463000 g/mol to 512000 g/mol, and the relative viscosity was measured to be as high as 110000 cps to 174000 cps. Moreover, it was confirmed that the polymer resin film obtained from the polyamide resin of Examples had a low yellowness index of 2.68 to 2.89 and a low haze value of 0.81% to 0.97% at a thickness of about 50 μm, thereby exhibiting excellent transparency. It was also confirmed that it had a high pencil hardness of 3H to 4H grade and a folding endurance that was broken at the number of reciprocating bending cycles from 9785 to 12022, thereby securing excellent mechanical properties (scratch resistance and folding endurance).

On the other hand, in the case of the polyamide resins of Reference Examples 1 to 3 in which the acyl chloride complex powder according to Preparation Examples 1 to 2 was not used in the synthesis process of the polyamide resin, the molecular weight was reduced from 350,000 g/mol to 412,000 g/mol compared to Examples. The viscosity was reduced from 24,000 cps to 54,000 cps compared to Examples. In addition, it was confirmed that the haze value was increased from 1.61% to 24.21% compared to Examples, showing that the transparency was poor.

This is because, in Reference Examples 1, 2, and 3, due to the difference in solubility and reactivity between the TPC powder and the IPC powder, the block due to TPC is excessively formed, thereby increasing the crystallinity of the polyamide resin.

Meanwhile, it was confirmed that the polyamide resin of Reference Example 4, in which acyl chloride was dissolved in an amide solvent and treated as a solution, had a very low molecular weight of 321,000 g/mol, showing that the viscosity was reduced to 18000 cps than Examples. This is presumably because in Reference Example 4, deterioration due to moisture and hybridization with amide solvents occurred during the dissolution of acyl chloride.

The invention claimed is:

1. A polyamide resin film comprising: a polyamide resin containing a backbone chain formed by alternative bonding of a first polyamide segment containing a first aromatic amide repeating unit, and a second polyamide segment containing a second aromatic amide repeating unit having a structure different from the first aromatic amide repeating unit,
    wherein a transmittance of ultraviolet light with a wavelength of 388 nm for a film specimen having a thickness of 45 μm or more and 55 μm or less is 15% or less, and
    wherein a UV-cut slope (dT/dλ) for the film specimen having a thickness of 45 μm or more and 55 μm or less as measured according to ASTM E424 is at least 0.25 in the range of 10% to 80% transmittance,
    wherein the backbone chain includes an alternating repeating unit represented by Chemical Formula 3,

[Chemical Formula 3]

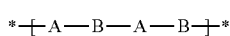

in the Chemical Formula 3,
A is the first polyamide segment, and
B is the second polyamide segment, and
    wherein a haze value measured according to ASTM D1003 for a film specimen having a thickness of 45 μm or more and 55 μm or less is 1.5% or less.

2. The polyamide resin film of claim 1, wherein
the first aromatic amide repeating unit is a repeating unit represented by Chemical Formula 1:

[Chemical Formula 1]

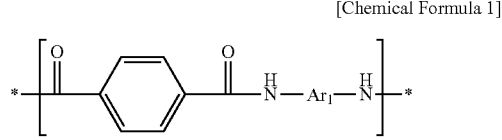

in the Chemical Formula 1,
$Ar_1$ is a substituted or unsubstituted arylene group having 6 to 20 carbon atoms, or a substituted or unsubstituted heteroarylene group having 2 to 20 carbon atoms.

3. The polyamide resin film of claim 1, wherein
the second aromatic amide repeating unit is a repeating unit represented by Chemical Formula 2:

[Chemical Formula 2]

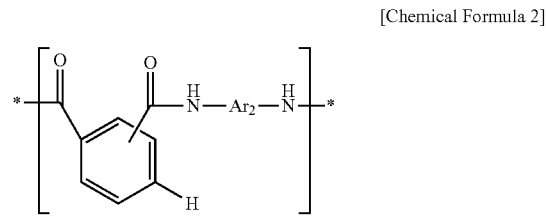

in the Chemical Formula 2,
$Ar_2$ is a substituted or unsubstituted arylene group having 6 to 20 carbon atoms, or a substituted or unsubstituted heteroarylene group having 2 to 20 carbon atoms.

4. The polyamide resin film of claim 1, wherein
the first polyamide segment includes a block of the first aromatic amide repeating units, and the second polyamide segment includes a block of the second aromatic amide repeating units.

5. The polyamide resin film of claim 1, wherein
the polyamide resin has a weight average molecular weight of at least 330000 g/mol.

6. The polyamide resin film of claim 1, wherein
the polyamide resin has a relative viscosity of at least 45,000 cps as measured according to ASTM D 2196.

7. The polyamide resin film of claim 1, wherein
based on the total repeating units contained in the polyamide resin, a content of the second aromatic amide repeating unit is 5 mol % to 60 mol %.

8. The polyamide resin film of claim 1, wherein
the first aromatic amide repeating unit is a repeating unit represented by Chemical Formula 1:

[Chemical Formula 1]

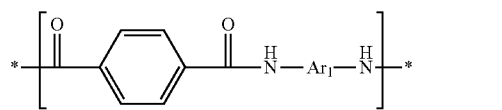

in the Chemical Formula 1,
Ar$_1$ is a substituted or unsubstituted arylene group having 6 to 20 carbon atoms, or a substituted or unsubstituted heteroarylene group having 2 to 20 carbon atoms, and
the second aromatic amide repeating unit is a repeating unit represented by Chemical Formula 2:

[Chemical Formula 2]

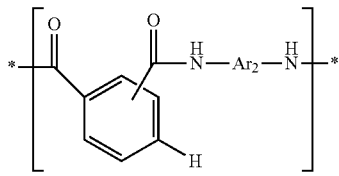

in the Chemical Formula 2,
Ar$_2$ is a substituted or unsubstituted arylene group having 6 to 20 carbon atoms, or a substituted or unsubstituted heteroarylene group having 2 to 20 carbon atoms, and
wherein based on the total repeating units contained in the polyamide resin, a content of the first aromatic amide repeating unit is 60 mol % to 95 mol %, and a content of the second aromatic amide repeating unit is 5 mol % to 40 mol %.

9. The polyamide resin film of claim 1, wherein the first polyamide segment has a number average molecular weight of 100 g/mol to 5000 g/mol.

10. The polyamide resin film of claim 1, wherein the alternating repeating unit represented by Chemical Formula 3 is a repeating unit represented by Chemical Formula 4:

13. The polyamide resin film of claim 1, wherein
the second aromatic amide repeating unit includes an amide repeating unit derived from a combination of a 1,2-aromatic diacyl compound and an aromatic diamine compound, or a repeating unit derived from a combination of a 1,3-aromatic diacyl compound and an aromatic diamine compound.

14. The polyamide resin film of claim 13, wherein
the 1,2-aromatic diacyl compound includes phthaloyl chloride, or phthalic acid,
the 1,3-aromatic diacyl compound includes isophthaloyl chloride or isophthalic acid, and
the aromatic diamine compound includes 2,2'-bis(trifluoromethyl)-4,4'-biphenyldiamine.

15. The polyamide resin film of claim 1, further comprising an ultraviolet light stabilizer dispersed in the polyamide resin.

16. The polyamide resin film of claim 15, wherein
the ultraviolet light stabilizer includes one or more compounds selected from the group consisting of a triazine-based UV absorber, a triazole-based UV absorber, and a HALS-based UV absorber.

17. The polyamide resin film of claim 16, wherein
the triazole-based UV absorber includes a compound represented by Chemical Formula 11:

[Chemical Formula 4]

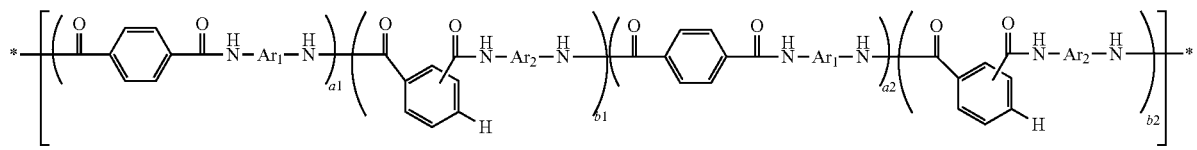

in the Chemical Formula 4,
Ar$_1$ and Ar$_2$ are each independently a substituted or unsubstituted arylene group having 6 to 20 carbon atoms, or a substituted or unsubstituted heteroarylene group having 2 to 20 carbon atoms,
a1 and a2 are each independently an integer of 1 to 10, and
b1 and b2 are each independently an integer of 1 to 5.

11. The polyamide resin film of claim 1, wherein
the first aromatic amide repeating unit is an amide repeating unit derived from a combination of a 1,4-aromatic diacyl compound and an aromatic diamine compound.

12. The polyamide resin film of claim 11, wherein
the 1,4-aromatic diacyl compound includes terephthaloyl chloride, or terephthalic acid, and
the aromatic diamine compound includes 2,2'-bis(trifluoromethyl)-4,4'-biphenyldiamine.

[Chemical Formula 11]

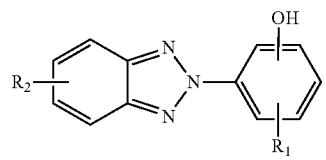

in the Chemical Formula 11,
R$_1$ and R$_2$ are each independently hydrogen or an alkyl group having 1 to 20 carbon atoms.

18. A resin laminate comprising:
a substrate including the polyamide resin film of claim 1; and
a hard coating layer formed on at least one side of the substrate.

* * * * *